United States Patent [19]
Frank et al.

[11] Patent Number: 4,776,076
[45] Date of Patent: Oct. 11, 1988

[54] METHOD OF FABRICATING A ROTOR HUB OF COMPOSITE MATERIAL

[75] Inventors: Ed Frank, Glenolden; Robert J. Ford, Broomall, both of Pa.

[73] Assignee: Boeing Company, Seattle, Wash.

[21] Appl. No.: 779,361

[22] Filed: Sep. 23, 1985

Related U.S. Application Data

[63] Continuation-in-part of Ser. No. 556,658, Nov. 30, 1983, Pat. No. 4,542,567.

[51] Int. Cl.$^4$ .................... B21K 3/00; B65H 81/00
[52] U.S. Cl. .................... 29/156.8 R; 29/428; 29/527.2; 29/419.1; 242/1; 242/7.02; 416/134 A; 416/230
[58] Field of Search .............. 29/156.8 R, 419 R, 428, 29/527.2; 242/1, 7.01, 7.02; 416/134 A, 138 A, 230, 244 R, 244 D

[56] References Cited

U.S. PATENT DOCUMENTS

| | | | |
|---|---|---|---|
| 3,279,278 | 10/1966 | Eldred | 416/134 A X |
| 3,603,173 | 9/1971 | Brooks | 416/134 A X |
| 4,038,885 | 8/1977 | Jonda | 416/134 A X |
| 4,293,276 | 10/1981 | Brogdon et al. | 416/134 A |
| 4,529,139 | 7/1985 | Smith et al. | 242/7.02 |
| 4,556,365 | 12/1985 | Mouille et al. | 416/230 A X |

FOREIGN PATENT DOCUMENTS 2332435 1/1974 Fed. Rep. of Germany .
3037824 5/1982 Fed. Rep. of Germany .

Primary Examiner—Howard N. Goldberg
Assistant Examiner—Ronald S. Wallace
Attorney, Agent, or Firm—Jones, Tullar & Cooper

[57] ABSTRACT

A method of fabricating a rotor hub of a fully articulated helicopter rotor system, the rotor hub including a central portion and at least two pairs of lug arms extending therefrom, according to which composite material is dispensed onto the mandrel and wound about a pair of lug arms and an associated part of the central portion of the mandrel to form a continuous closed loop of the composite material to a desired width and thickness. The winding is repeated for each pair of lug arms and its associated part of the central portion of the mandrel so that as many loops of composite material are formed as there are lug pairs. The finally assembled loops are cured to structuralize the loops.

5 Claims, 2 Drawing Sheets

METHOD OF FABRICATING A ROTOR HUB OF COMPOSITE MATERIAL

CROSS-REFERENCE TO RELATED APPLICATIONS

This application disclosed subject matter in common with co-pending application, Ser. No. 429,365 filed Sept. 30, 1982, now U.S. Pat. No. 4,543,040 issued Sept. 24, 1985, and a continuation-in-part of co-pending application Ser. No. 556,658 filed Nov. 30, 1983, now U.S. Pat. No. 4,542,567 issued Sept. 24, 1985.

TECHNICAL FIELD

The present invention relates to the fabrication of rotor hubs for helicopter rotor systems, and in particular to the fabrication of the rotor hubs from composite material and using a winding or wrapping (hereinafter winding) technique.

According to composite technology, a resin preimpregnated tape having, for example, fiberglass filament is utilized with or without additional resin adhesive to construct the particular part desired. The final part is built-up of a successive application of layers (layup) of the tape onto a working surface as, for example, a mandrel. The resulting part is light in weight and highly load redundant, so it is more desirable than a corresponding part made from traditional materials such as steel, aluminum, etc.

Instead of filament tape, individual filaments may be used. In either case, the dispensing technique can be identical.

PRIOR ART

Helicopter rotor system design technology has turned in recent years to the use of composite material. Composite materials have been shown to improve life, damage tolerance and fail safety when substituted for metal in helicopter rotor hubs due to their relative notch insensitivity, slow crack growth, superior fatigue strain endurance and high strain energy storage prior to fiber failure. Composites are not susceptible to corrosion and are readily inspectable using ultrasonic and/or radiographic techniques to detect flaws in their laminar and fiber content. Their high specific strength and stiffness offer the potential of significant weight reduction.

The application of composite material to the rotor hub of a helicopter has been suggested. See, for example, U.S. Pat. Nos. 3,762,834 and 4,012,169. The technique employed is that of laminating plates together. This technique is relatively time consuming.

SUMMARY OF THE INVENTION

A preferred technique for fabricating the rotor hub of a fully-articulated rotor system would be one which employs winding because of the time savings realized. Winding as a fabricating technique for composite material is known. See, for example, U.S. Pat. Nos. 3,733,233; 4,242,160; 4,247,258; 4,264,278; 4,273,601 and 4,350,549. None of these patents disclose a technique for winding of a rotor hub.

The fabrication of a rotor hub utilizing a winding technique employs a mandrel which approximates the final shape of the hub to be fabricated. Basically, the mandrel receives composite material, such as tape or individual filaments which is wound according to a selective path about the mandrel. The winding continues until the desired thickness of tape or filaments is attained. The wound hub is then cured so that the tape or filaments may be structuralized and a rigid structure formed.

A rotor hub of a fully articulated rotor system comprises in its essential parts a central portion from which at least two pairs of lug arms extend for a two-bladed rotor system. Each pair of lug arms comprises two parallel extending lugs which together form a clevis joint to which the root end of a rotor blade is attached. According to the present invention, each lug arm pair and a part of the central portion is constructed as a continuous and closed loop from composite material (tape or filaments). A two bladed rotor hub would therefore include two such closed loops, while a three bladed rotor would include three and a four bladed rotor would include four. Moreover, each loop can be completely fabricated before the next loop is fabricated, or they may be fabricated in alternative fashion.

BRIEF DESCRIPTION OF THE DRAWINGS

Four figures have been selected to illustrate a preferred embodiment of the present invention. Included are.

DETAILED DESCRIPTION

Figure 1:
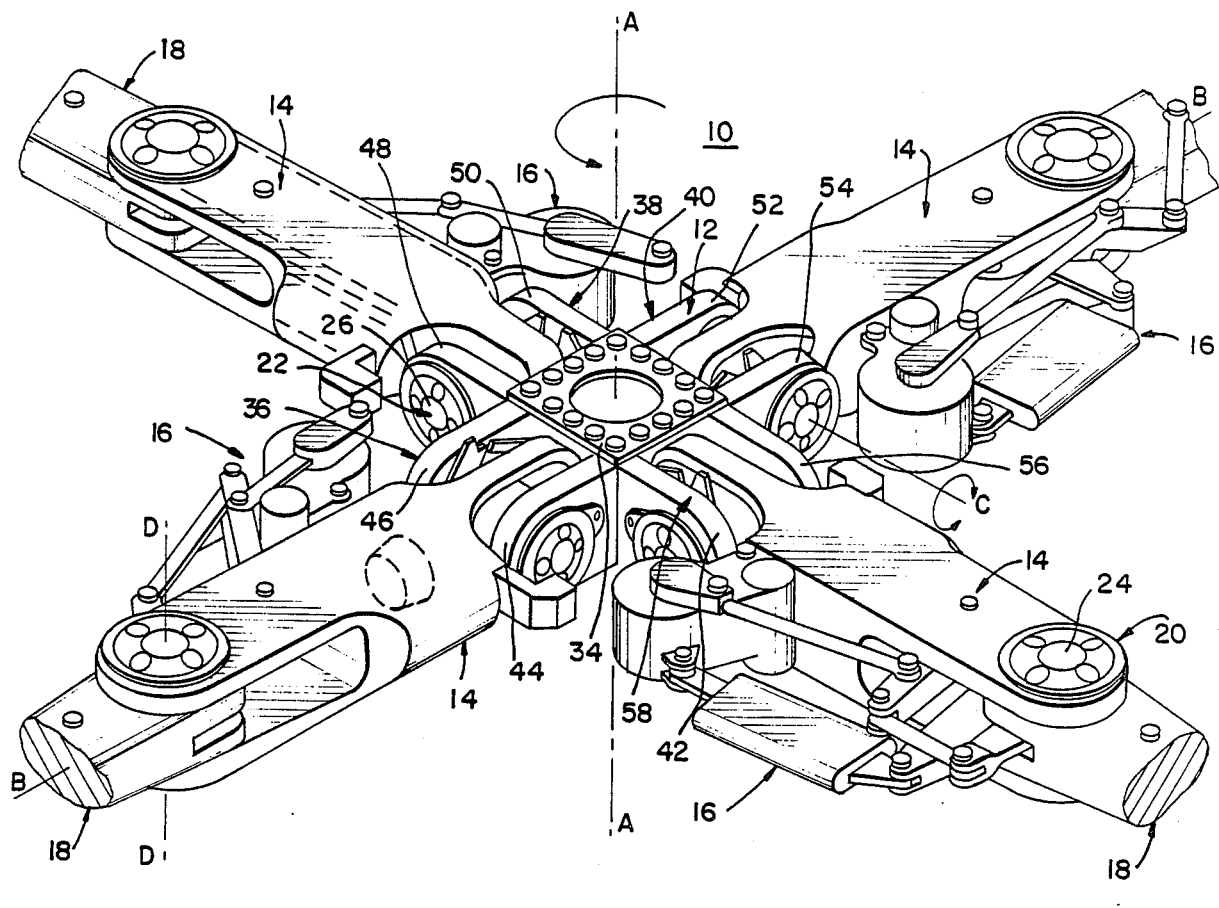
FIG. 1, which is a perspective view of a four bladed rotor system including a rotor hub which can be fabricated according to the present invention.

A four bladed rotor system 10 is illustrated in FIG. 1 as one example of a fully articulated rotor system. A two bladed or three bladed rotor system would also be appropriate for application of the present invention.

The four bladed rotor system 10 generally includes a rotor hub 12, four pitch housings 14, four lag damper and blade folding mechanisms 16 and four blades 18. The components assembled as shown in FIG. 1 comprise a fully-articulated rotor system, i.e., a system which rotates about axis A—A and in which the rotor blades are permitted pitching, flapping and lead-lag movement about a respective pitch axis B—B, flap axis C—C and lead-lag axis D—D.

To permit the pitch, flap and lead-lag movement, elastomeric pitch, flap and lead-lag bearings (not shown in detail) are preferred. The lead-lag bearings and the flap bearings form part of lead-lag hinges 20 and flap hinges 22. The lead-lag hinges 20 also include pins 24 (commonly referred to as the vertical pins), and the flap hinges 22 also include pins 26 (commonly referred to as the horizontal pins). The pitch bearings, flap bearings and the lead-lag bearings are configured to accommodate both radial and axial loads while permitting angular oscillation. This is accomplished by alternate laminae of elastomeric material, through which shear deflection permits angular oscillatory motions and laminae of metal which restrict a lateral distortion or flow of the elastomer material when under compressive loading. Bearings of this type in a rotor system are know.

The rotor hub 12 includes as shown in FIG. 1 a central portion 34 and four lug pairs 36, 38, 40 and 42. Each lug pair includes two parallel extending lugs 44,46; 48,50; 52,54 and 56,58.

Figure 2:
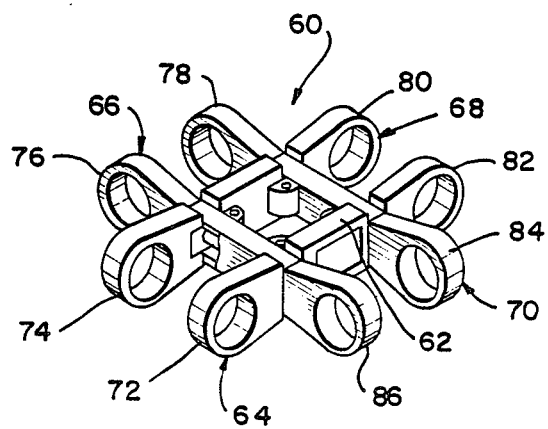
FIG. 2, which is a perspective view of a mandrel used to fabricate the rotor hub of the rotor system of FIG. 1.

To fabricate a rotor hub such as rotor hub 12 according to the present invention a mandrel is required onto which the composite material is wound. Such a mandrel 60 is shown in FIG. 2. The mandrel 60 necessarily approximates the final shape of the hub 12 and accordingly includes a central portion 62, four lug pairs 64, 66, 68 and 70, with each lug pair comprising two parallel extending lugs 72,74; 76,78; 80,82 and 84,86. The mandrel 60 can be assembled similarly to the four cores illustrated in the above-noted patents. Also, the individual cores, which form the central portion and lug pairs of the mandrel, can be fabricated of composite material or of metal. Preferably, however, they are made of composite material. The cores when fabricated of composite material can be formed as layups of composite material tape, or they can be wound. In either case, the fabrication can proceed according to know techniques.

Figure 3:
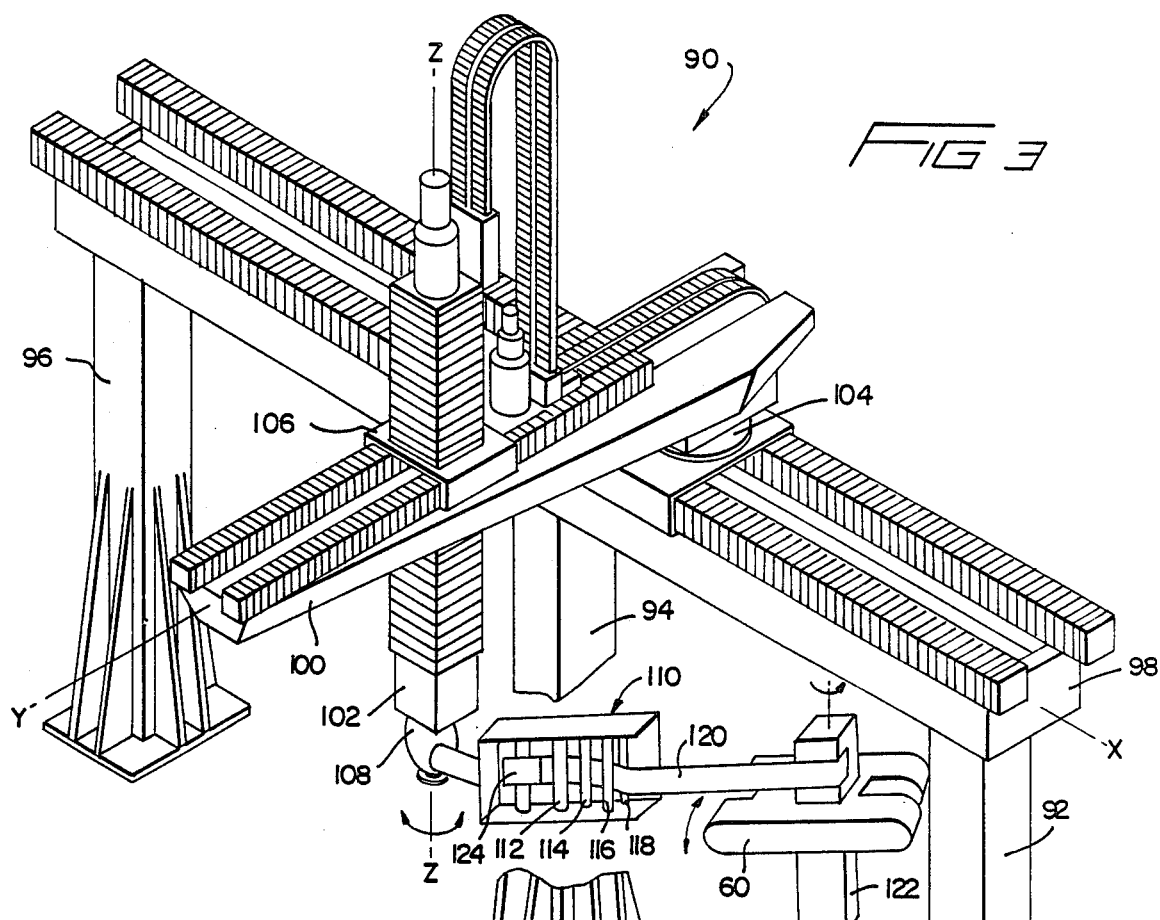
FIG. 3, which is a perspective view of a robot which is used in the fabrication of the rotor hub of FIG. 2, with the mounting bracket and mandrel rotated for ease of illustration.

When the mandrel is assembled as shown in FIG. 2, it is mounted on a rotatable floor stand 88 used in conjunction with a programmable manipulator or robot 90 (FIG. 3). The robot 90 is a commerically available apparatus. Such a robot is manufactured by Unimation, Inc. of Danbury, Conn.

Since the robot 90 is commerically available only its basic components will be discussed. The robot 90 is a three-axis machine with translational capability in the X-Y-Z directions and with rotational capability about the Z-axis. Essentially, the robot 90 purchased by the assignee of the present application for use in fabricating the rotor hub according to the present invention includes three base pedestals 92, 94 and 96. The base pedestals 92, 94 and 96 support the X-axis way 98 and the Y-axis way 100. The Y-axis way 100 supports a Z-axis way 102. A carriage 104 is mounted to the X-axis way 98 and a carriage 106 is mounted to the Y-axis way 100. The Z-axis way is mounted to the carriage 106. As seen in FIG. 3, the Y-axis way 100 is mounted to the carriage 104 so that the Y-axis way 100 is displaceable along the X-axis.

At one end of the Z-axis way there is mounted a swivel joint 108 which rotates about the Z-axis. Mounted to the swivel joint 108 is a composite material mounting bracket 110 including an idle roller 112 and tension rollers 114, 116 and 118. A supply spool 124 of tape or filaments 120 is mounted to the bracket 110 and the tape or filaments dispensed onto the mandrel 60. The mandrel 60 is mounted to the rotatable floor stand 88. For this purpose the floor stand 88 includes a mounting post 122 which secures the mandrel 60 to the floor stand 88 and also serves as a fixture about which the composite material is wrapped to aid in forming the central portion of the rotor hub.

Control of robot movement is provided by the manufacturer. See, for example, U.S. Pat. No. 4,224,501. The control disclosed is adaptable to provide the necessary movement of the bracket 110, and is compatible with the movement of the floor stand 88 to achieve the desired dispensing of the composite material and winding of the composite material onto the mandrel 60. Rotation of the floor stand 88 imparts a tension to the composite material while movement of the robot 90 along its three ways and of the swivel joint 108 about the Z-axis produces the winding of the continuous closed loops.

Figure 4:
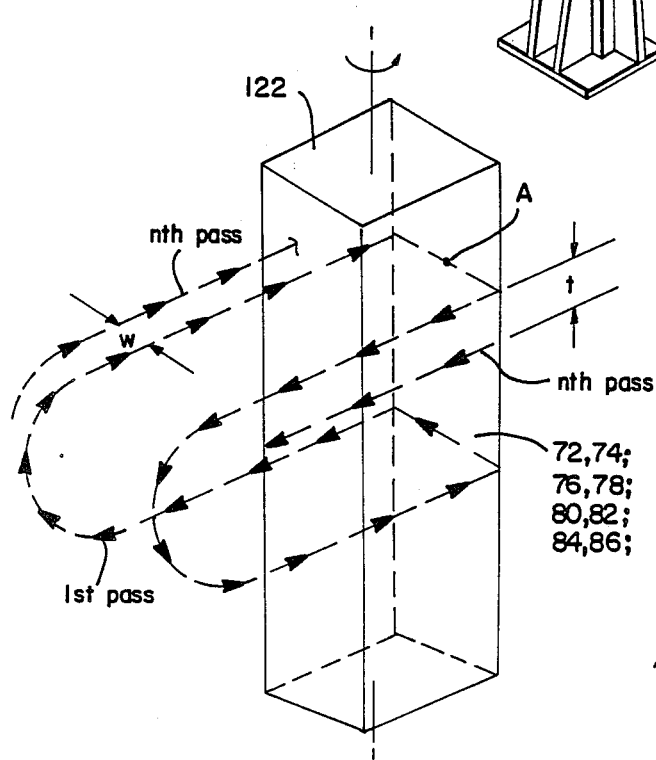
FIG. 4, which is a schematic view illustrating a winding path to form one of the continuous closed loops of the rotor hub.

Referring to FIG. 4, the winding path followed to form one continuous closed loop is shown along with the post 122 only. It should be understood, however, that the winding occurs onto the mandrel 60. The composite material is first manually dispensed from the supply spool 124 (FIG. 3) and adhered, by any conventional adhesive to point A adjacent to the post 122. The frame 88, and thereby the post 122 is pivoted through an angle of, for example, 30°. The robot 90 then commenses its movement to wind the composite material in the direction of the arrows as shown. The pivoting of the post 122 provides the necessary tension to the composite material so that winding can proceed. A single complete pass is shown in FIG. 4. It will be appreciated, however, that the number of passes (n passes) will vary depending on the width (w) and thickness (t) of the loop desired. Also, different types of composite material can be used in successive or alternating passes. For example, one or several passes can be made with a composite material comprising a tape having uni-directional fiber filaments, while one or several other passes can be made with a composite material comprising a tape having its fiber filaments at an angle to the longitudinal axis of the tape, so-called X-ply tape.

The winding procedure described above is repeated for each lug pair desired. As previously noted, a two-bladed rotor hub will have two continuous closed loops, a three-bladed rotor hub will have three continuous closed loops and a four-bladed rotor hub will have four continuous closed loops. The individual loops can be completely wound before the next loop is wound, or the winding can proceed alternatively so that the central portion of the hub will possess an interleaved configuration similar to one of the rotor hub variants disclosed in the noted co-pending applications. Also, in the region of the central portion of the mandrel 60 where the various loops cross over or intersect filler segments may be inserted similar to one of the rotor hub variants disclosed in the noted co-pending applications. The filler segments are preferably formed in advance from composite material.

The composite material for the loops is 'S' glass epoxy prepreg per BMS 8-164, class 'A', type I-1; epoxy impregnated prepreg 'E' glass per BMS 8-79, class III, GR 1, type 1581, Form (1); 45° bias plied epoxy prepreg per BMS 8-164, class A, type III; and T300/F-155 undirectional graphite epoxy prepreg per BMS 8-168. The cores of the mandrel 60 and the filler segments are preferably fabricated of epoxy impregnated prepreg 'E' glass per BMS 8-79, class III, GR 1, type 1581, form (1), or simply molded of chopped fibers.

The finally wound assembly is cured in accordance with the type of material used. For example, if filament wound an initial cure at approximately 150° for up to one hour to gel the outside of the assembly, followed by a room cure for about 8 hours is sufficient. If tape is used, curing at 250° and 50–100 psi pressure for from 3.5 to 5 hours is sufficient. Once cured the loops, filler segments and cores are structuralized, i.e., capable of accepting external loads. Alternatively, if the cores are not intended to be part of the final assembly, they can be made, for example, of styrofoam. As such, these cores will experience shrinkage during the cure cycle so that they can be easily removed thereafter. According to another variant they can be dissolved after the cure cycle is complete.

What is claimed:

1. A method of fabricating a rotor hub of a fully articulated helicopter rotor system, the rotor hub including a central portion and at least two pairs of lug arms extending therefrom, said method comprising the steps of:

forming a mandrel including a central portion and an equal number of pairs of lug arms to that of the rotor hub extending from the central portion;

dispensing a composite material onto the mandrel and winding said dispensed material about a pair of lug arms and an associated part of the central portion of the mandrel to form a continuous closed loop of composite material to a desired width and thickness;

repeating the winding step for each pair of lug arms and its associated part of the central portion of the mandrel, thereby forming as many continuous closed loops of composite material as there are lug pairs; and subjecting the assembly including the mandrel and wound continuous closed loops to a curing cycle to at least structuralize the continuous closed loops.

2. The method as defined in claim 1, wherein each continuous closed loop is wound to the desired width and thickness separately.

3. The method as defined in claim 2, further comprising the step of:

inserting filler segments between the various loops a their intersection.

4. The method as defined in claim 1, wherein the continuous closed loops are wound alternatively to the desired width and thickness.

5. The method as defined in claim 4, further comprising the step of:

inserting filler segments between the interleaved intersections of the various loops.

* * * * *

UNITED STATES PATENT AND TRADEMARK OFFICE
CERTIFICATE OF CORRECTION

PATENT NO. : 4,776,076

DATED : October 11, 1988

INVENTOR(S) : Ed Frank et al

It is certified that error appears in the above-identified patent and that said Letters Patent is hereby corrected as shown below:

Claim 3, column 6, line 11, "a" should be --at--.

Signed and Sealed this

Twelfth Day of September, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,776,076
DATED : October 11, 1988
INVENTOR(S) : Ed Frank et al

It is certified that error appears in the above-identified patent and that said Letters Patent is hereby corrected as shown below:

On the title page item [63]:

Under "Related U.S. Application Data" the designation "Continuation-in-part of Ser. No. 556,658, Nov. 30, 1983, Pat. No. 4,542,567" should be changed to --Discloses subject matter in common with Ser. Nos. 429,365 and 556,658, now Pat. Nos. 4,543,040 and 4,542,567, respectively--.

Signed and Sealed this

Eleventh Day of August, 1992

*Attest:*

DOUGLAS B. COMER

*Attesting Officer*  *Acting Commissioner of Patents and Trademarks*